UNITED STATES PATENT OFFICE.

GEORGE W. MASON, OF SHARON, PENNSYLVANIA.

ARTIFICIAL STONE.

SPECIFICATION forming part of Letters Patent No. 234,833, dated November 23, 1880.

Application filed September 8, 1880. (No model.)

*To all whom it may concern:*

Be it known that I, GEORGE WASHINGTON MASON, of Sharon, in the county of Mercer and State of Pennsylvania, have invented a new and Improved Artificial Stone, of which the following is a specification.

The object of my invention is to provide a new and improved artificial stone which is hard, strong, and durable, and is not affected by moisture and the rays of the sun.

My composition consists of the following ingredients, combined in the following proportions: Four to five gallons of coal-tar are boiled down to three gallons of pitch, and to this pitch about one-eighth of a bushel of Akron cement and one bushel of sand or gravel, marble-chips, or small stones are added, so as to produce a stiff mortar. The pitch is boiled, and while boiling the cement, sand, or stone chips, which are heated in suitable vessels, are mixed with the pitch. This mixture is then spread in suitable molds of wood or metal to form stones of the desired size or shape.

The pebbles are rolled into the soft upper surface of the stone before the same hardens.

A block of the artificial stone may be planed down to show the various colored sections of the pebbles. A very handsome effect is thus produced.

The within-described stone is hard and durable, and is not affected by cold or moisture.

Paving-stones, cisterns, tiles, drain-pipes, cellar-slabs, &c., can be made with the above-described materials very advantageously.

Having thus described my invention, I claim as new and desire to secure by Letters Patent—

A block of artificial stone formed of pitch, cement, sand, and embedded surface-pebbles, the latter planed down to exhibit their various colors, as described.

GEORGE WASHINGTON MASON.

Witnesses:
  SETH McKNIGHT,
  JOHN McELDOWNEY.